United States Patent
Reed

(10) Patent No.: US 7,469,366 B1
(45) Date of Patent: Dec. 23, 2008

(54) MEASUREMENT OF HEALTH STATISTICS FOR A HIGH-SPEED INTERFACE

(75) Inventor: David Reed, Saratoga, CA (US)

(73) Assignee: Nvidia Corporation, Santa Clara, CA (US)

( * ) Notice: Subject to any disclaimer, the term of this patent is extended or adjusted under 35 U.S.C. 154(b) by 249 days.

(21) Appl. No.: 11/302,581

(22) Filed: Dec. 13, 2005

(51) Int. Cl.
*G06F 11/00* (2006.01)
(52) U.S. Cl. .................. 714/704; 714/742; 714/815
(58) Field of Classification Search .......... 714/704, 714/742, 815
See application file for complete search history.

(56) References Cited

U.S. PATENT DOCUMENTS 6,185,694 B1 * 2/2001 Daughtry ............ 713/601
6,718,494 B1 * 4/2004 Jamil et al. ............. 714/723
2004/0250191 A1 * 12/2004 Leaming ................ 714/742

* cited by examiner

*Primary Examiner*—Guy J Lamarre
(74) *Attorney, Agent, or Firm*—Townsend and Townsend and Crew, LLP

(57) ABSTRACT

Health of a high-speed interface link, such as a PCI Express link, is measured. In one embodiment, counter data representing data sent and errors occurring in a high-speed interface link is read. Health statistics based on the counter data are computed. The health statistics may be displayed as a graphical representation. Various statistics representing bus utilization, error rates, efficiency and/or other measures of link health may be computed and displayed.

20 Claims, 5 Drawing Sheets

MEASUREMENT OF HEALTH STATISTICS FOR A HIGH-SPEED INTERFACE

BACKGROUND OF THE INVENTION

The present invention relates in general to bus interfaces, and in particular to methods and systems for measuring health of a high-speed interface link.

Modern personal computer systems generally include a number of different components, such as processors, memory, data storage devices using magnetic or optical media, user input devices (e.g., keyboards and mice), output devices (e.g., monitors and printers), graphics processors, and so on. All of these components communicate with each other via various buses implemented on a motherboard of the system. Numerous bus protocols are used, including PCI (Peripheral Component Interconnect), PCI-E (PCI Express), AGP (Accelerated Graphics Port), HyperTransport, and so on. Each bus protocol specifies the physical and electrical characteristics of the connections, as well as the format for transferring information via the bus. In many instances, the buses of a personal computer system are segmented, with different segments sometimes using different bus protocols, and the system includes bridge chips that interconnect different segments.

Buses enable system components to exchange data and control signals. For instance, when a graphics processor needs to read texture or vertex data (or other data) stored in system memory, the graphics processor requests the data via a bus and receives a response via the same bus. Where many devices are making requests for data (e.g., from system memory) or where one device is making large or frequent requests, a bus or bus segment can become saturated, leading to decreased performance. In fact, modern graphics processors are often bandwidth-limited; that is, the graphics processor's performance is limited by the ability of the bus (or buses) to deliver needed data to the graphics processor.

To increase the rate at which data can be supplied, computer game enthusiasts frequently increase the speed of a reference clock used to control the transmitting and receiving of data via the bus, a practice referred to as "overclocking." When the speed of a reference clock is increased beyond a certain threshold, however, the efficiency of data exchange decreases and more errors occur. Thus, it is possible to overclock too far and degrade rather than enhance system performance.

More recently, "unidirectional" buses have become popular. An example is PCI Express (PCI-E), which provides physically separate paths for transmitting and receiving data packets. In a unidirectional bus, responses sent by a remote device onto the receiving path generally do not create backpressure on the transmission path, and so backpressure is not a reliable indicator of when overclocking begins to degrade system performance. In addition, when packet errors occur, the packets that were not correctly received are resent, resulting in increased traffic on the bus without actually increasing throughput.

It would therefore be desirable to provide methods and systems to facilitate measuring health of a high-speed interface link.

BRIEF SUMMARY OF THE INVENTION

Embodiments of the present invention facilitate measuring health of a high-speed interface link. In accordance with one embodiment, counter data representing data sent and errors occurring in a high-speed interface link is read. Health statistics based on the counter data are computed. The health statistics may be displayed as a graphical representation. In accordance with another embodiment, an amount of data sent to a slave processor is measured. A bus utilization value based on the amount of data sent during a time interval and a theoretical upper limit is calculated. The bus utilization value may be displayed as a graphical representation.

In one embodiment of the present invention, a method for measuring health of a high-speed interface link includes reading counter data representing data sent and errors for a high speed interface link between a bus interface unit and a slave processor. A health statistic based on the counted data is computed, and the health statistic is displayed.

According to another embodiment of the present invention, a method for measuring health of a high-speed interface link includes detecting a number (L) of packets sent to a slave processor by a bus interface unit that are lost or received with errors. A number (E) of packets received by the bus interface unit from the slave processor that contain errors is detected. A number (M) of total packets sent from the bus interface unit to the slave processor and a number (G) of total packets received by the bus interface unit from the slave processor are also detected. A number (N) of times when a recovery mode is entered is detected. A health statistic is computed from the numbers L, E, M, G, and N, and the health statistic relating to the high-speed interface link is displayed.

According to still another embodiment of the present invention, a system for measuring health of a high-speed interface link includes a computer program product configured to read counter data representing data sent and errors occurring in a high-speed interface link, compute health statistics based on the counter data, and display the health statistics.

The following detailed description together with the accompanying drawings will provide a better understanding of the nature and advantages of the present invention.

DETAILED DESCRIPTION OF THE INVENTION

Embodiments of the present invention facilitate measuring health of a high-speed bus link. In accordance with one embodiment, counter data representing data sent and errors occurring in a high-speed bus link is read. Health statistics based on the counter data are computed. The health statistics may be displayed in a graphical representation. In accordance with another embodiment, an amount of data sent to a slave processor is measured. A bus utilization value based on the amount of data sent during a time interval and a theoretical upper limit is calculated. The bus utilization value may be displayed as a graphical representation.

Figure 1:
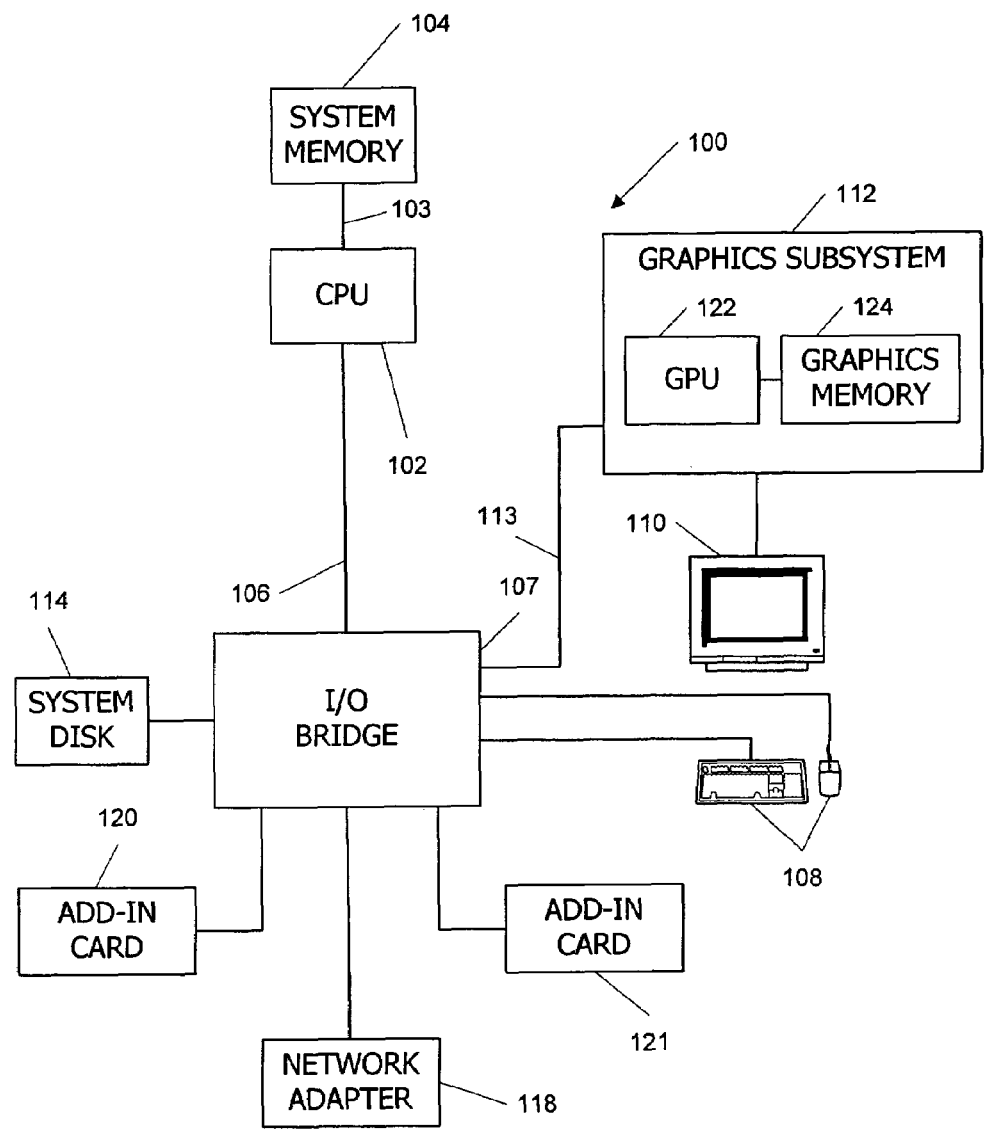
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus path 103. CPU 102 is connected via a bus path 106 to an I/O (input/output) bridge 107. I/O bridge 107 receives user input from one or more user input devices 108 (e.g., keyboard, mouse) and forwards the input to CPU 102 via bus 106. Visual output is provided on a pixel based display device 110 (e.g., a conventional CRT or LCD based monitor) operating under control of a graphics subsystem 112 coupled to I/O bridge 107 via a bus 113. A system disk 114 is also connected to I/O bridge 107. I/O bridge provides connections to other components such as a network adapter 118 and various add-in cards 120 and 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI Express (PCI-E), AGP (Accelerated Graphics Port), HyperTransport, or any other bus protocol(s), and connections between different devices may use different protocols as is known in the art.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via a memory bridge, I/O bridge 107, and bus 113, interacting with graphics memory 124 to store and update pixel data, and the like. For example, GPU 122 may generate pixel data from 2-D or 3-D scene data provided by various programs executing on CPU 102. GPU 122 may also store pixel data received via I/O bridge 107 to graphics memory 124 with or without further processing. GPU 122 may also include a scanout module configured to deliver pixel data from graphics memory 124 to display device 110.

CPU 102 operates as the master processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102.

It will be appreciated that the system shown herein is illustrative and that variations and modifications are possible. The bus topology, including the number and arrangement of bridges, may be modified as desired. For instance, in some embodiments, system memory 104 is connected to a memory bridge located between CPU 102 and I/O bridge 107 rather than through CPU 102, and other devices communicate with system memory 104 via the memory bridge without involvement of CPU 102. In other embodiments, graphics subsystem 112 is connected to the memory bridge rather than to I/O bridge 107. In still other embodiments, I/O bridge 107 and the memory bridge might be integrated into a single chip with system memory 104 connected to that chip. The particular components shown herein are optional; for instance, any number of add-in cards or peripheral devices might be supported. Such components can connect to the I/O bridge directly or via a switch (e.g., a PCI-E switch) as is known in the art.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as a memory bridge or I/O bridge 107.

A GPU may be provided with any amount of local graphics memory, including no local memory, and may use local memory and system memory in any combination. For instance, in a unified memory architecture (UMA) embodiment, no dedicated graphics memory device is provided, and the GPU uses system memory exclusively or almost exclusively. In UMA embodiments, the GPU may be integrated into a bus bridge chip or provided as a discrete chip with a high-speed bus (e.g., PCI-E) connecting the GPU to the bridge chip and system memory.

It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs and/or bridge chips embodying aspects of the present invention may be incorporated into a variety of devices, including general purpose computer systems, video game consoles and other special purpose computer systems, DVD players, handheld devices such as mobile phones or personal digital assistants, and so on.

Figure 2:
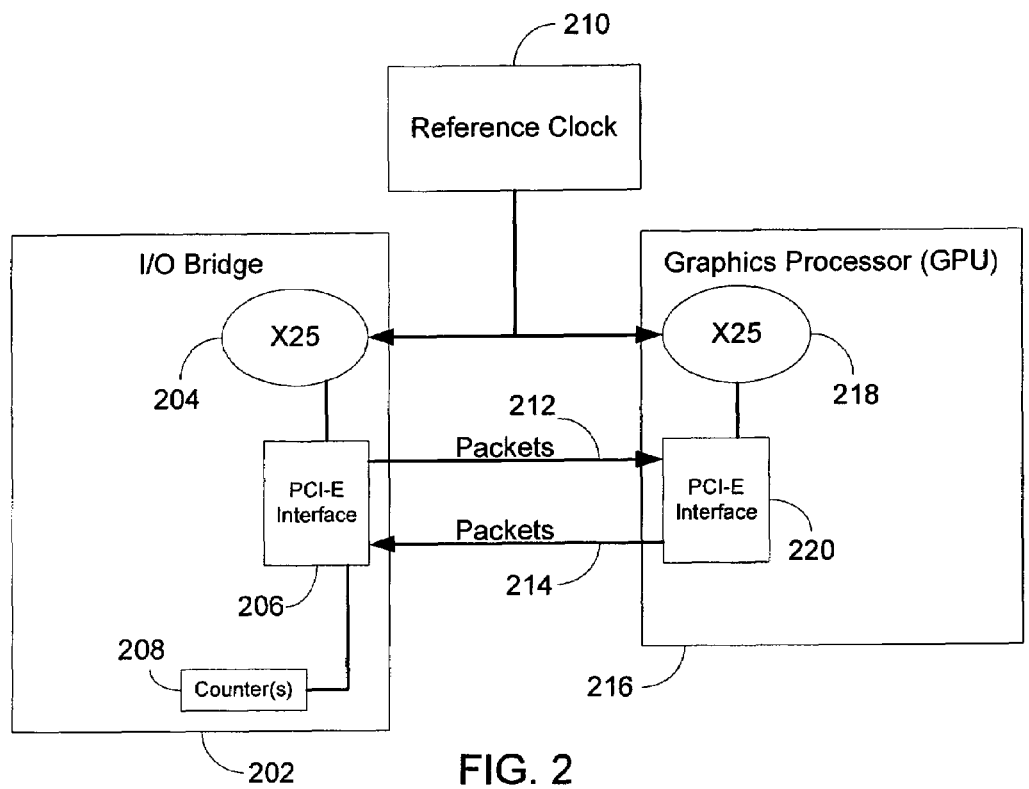
FIG. 2 is a block diagram of a bus connection between two devices according to an embodiment of the present invention.

FIG. 2 is a block diagram showing an I/O bridge 202 coupled to GPU 216 and a reference clock 210 according to an embodiment of the present invention. Reference clock 210 provides clock pulses to I/O bridge 202 and GPU 216. In some embodiments, reference clock 210 can be integrated into I/O bridge 202. The clock pulses are at a constant rate (e.g., 100 MHz), and in some embodiments, the rate can be adjusted by a user (e.g., to overclock the bus).

I/O bridge 202 (an example of a bus interface unit) includes a multiplier 204, a PCI-E interface 206, and a counter 208. Multiplier 204 is configured to receive clock pulses from reference clock 210 and multiply these clock pulses by a factor (e.g., 25) before distributing the pulses to PCI-E interface 206. GPU 216 (an example of a slave processor) includes a multiplier 218 and a PCI-E interface 220. Multiplier 218 is configured to receive clock pulses from reference clock 210 and multiply these clock pulses by a factor (e.g., 25) before distributing the pulses to PCI-E interface 220. It will be appreciated that multipliers 204 and 218 are optional. In one embodiment of the present invention, multipliers 204 and 218 are advantageously identical.

PCI-E interface 220 is coupled to PCI-E interface 206 of I/O bridge 202, forming a PCI-E link. In one embodiment, both PCI-E interfaces 206 and 220 are identical. As is well known in the art, two distinct paths (downlink 212 and uplink 214) connect the PCI-E interfaces to each other. PCI-E interface 206 is configured to send packets to PCI-E interface 220 through downlink 212, and PCI-E interface 220 is configured to send packets to PCI-E interface 206 through uplink 214.

Reference clock 210 controls the transmission (and receiving) frequency for PCI-E interfaces 206 and 220. In some embodiments, the rate of reference clock 210 can be changed (e.g., overclocked).

Counter 208 collects statistics regarding movement of data on downlink 212 and uplink 214. Counter 208 may include one or more counters of generally conventional design that count instances of various occurrences on the high speed link. Which occurrences are counted depends on the bus protocol used to implement the link. Examples of counter data for a PCI-E link are described below.

Figure 3:
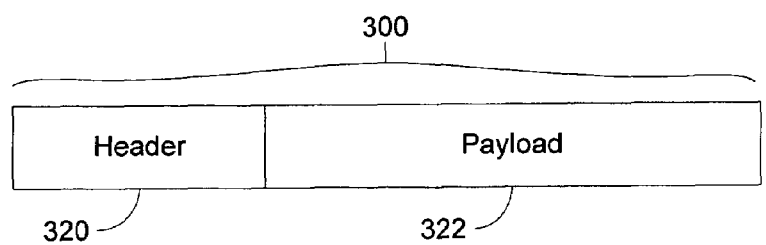
FIG. 3 illustrates the composition of a conventional PCI-E packet.

FIG. 3 illustrates the composition of a conventional PCI-E packet. Packet 300 includes a header 320 and payload 322. Header 320, which is fixed-length, contains address and packet-size information, a packet identifying tag, control information, and CRC (cyclic redundancy check) bits used to verify an accurate transmission of data. Payload 322, which is variable-length, contains any data associated with the packet. Packets such as packet 300 are sent and received through downlink 212 and uplink 214, between PCI-E interfaces 206 and 220. For example, when GPU 216 needs to read texture or vertex data (or other data) stored in system memory, GPU 216 requests the data by sending a read request packet via uplink 214 and receives a data packet in response via downlink 212.

As is well known in the art, in a PCI-E protocol, for every packet sent through the PCI-E link (e.g., by I/O bridge 202 of FIG. 2), the target device (e.g., GPU 216) sends back an acknowledgement (ACK) to the sending device if it receives the packet without error. An ACK, which is separate from any data transfer, may be a small packet that simply indicates successful receipt of the request packet or a set of request packets, e.g., by returning the tag associated with the most recent request packet successfully received. In the case of a read request, the target device would return an ACK upon receipt of the request and (after an applicable read latency period) the requested data in a separate packet. The requesting device would then send an ACK back to the target device to indicate receipt of the data.

If the target device receives the packet but with an error, such as a CRC or unexpected symbol error, a NO-ACK (NACK) is sent back to the sending device, and the sending device resends the packet. The target device sends back nothing if no packet is received at all. For each packet sent, the sending device waits for a fixed timeout period to receive an ACK or NACK. If no ACK or NACK is received within that period, a timeout error occurs, and the sending device resends the packet.

In some embodiments of the present invention, counter 208 is configured to count any or all of the following:

(1) the number of packets sent to PCI-E interface 220 by PCI-E interface 206;
(2) the number of ACKs received from PCI-E interface 220 by PCI-E interface 206;
(3) the number of NACKs received from PCI-E interface 220 by PCI-E interface 206;
(4) the number of timeouts detected by PCI-E interface 206;
(5) the number of packets received from PCI-E interface 220 without errors;
(6) the number of packets received from PCI-E interface 220 with errors; and
(7) the frequency with which retries occur due to NACKs and/or timeouts.

In some embodiments, counter 208 also counts the amount of data (S) sent by PCI-E interface 206. For instance, each time PCI-E interface 206 sends a packet, the size of the packet can be added to a running total kept by counter 208. The amount of data received by PCI-E interface 206 can also be counted in a similar fashion.

In some embodiments, counter 208 may also keep track of link failures and recovery attempts. PCI-E uses certain "states" in recovering from link errors, and counter 208 may count state transitions.

Figure 4:
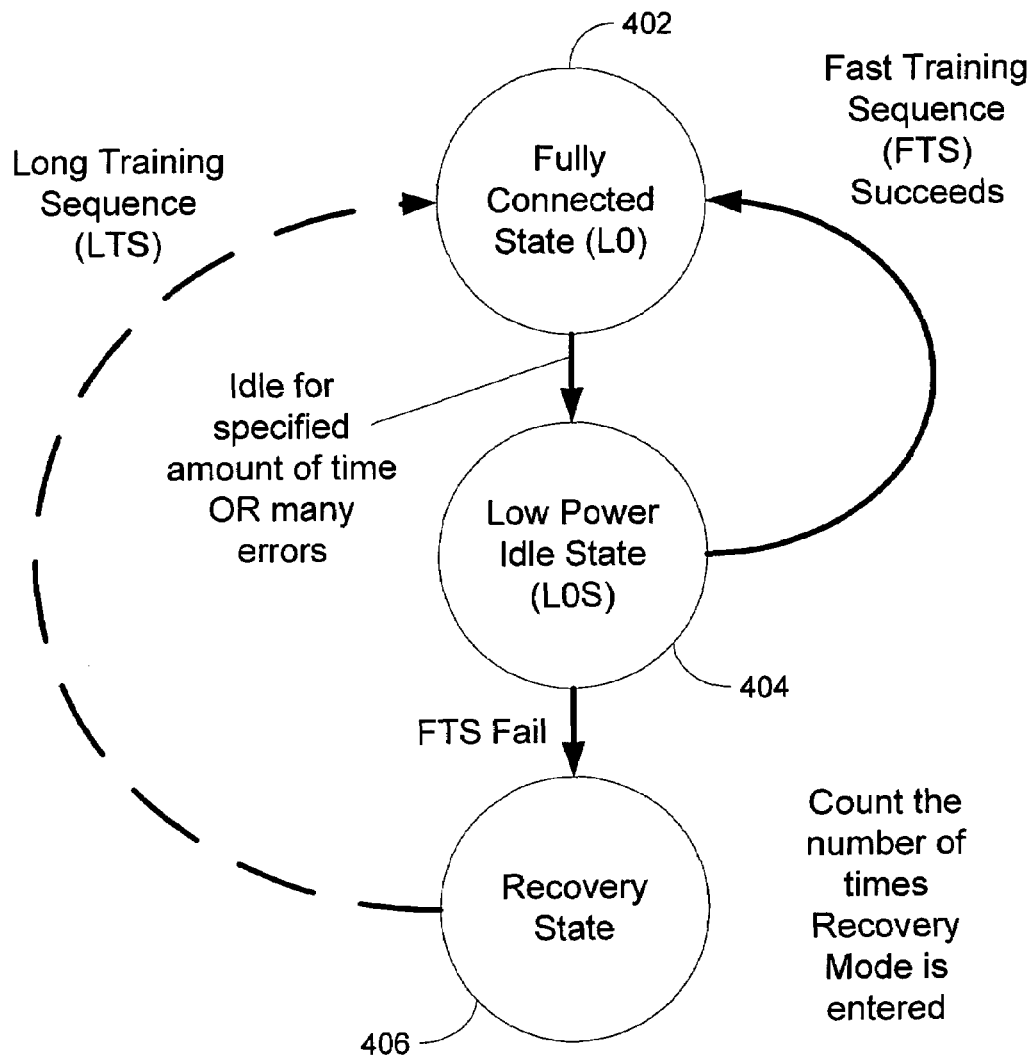
FIG. 4 is a simplified state machine diagram for a PCI-E interface according to an embodiment of the present invention.

FIG. 4 is a simplified state machine diagram for a PCI-E interface. In "Fully Connected" (L0) state 402, downlink 212 and uplink 214 are fully connected, and packets can be sent between PCI-E interfaces 206 and 220. When links 212 and 214 are both idle for a specified amount of time, or when the packet error rate exceeds a predetermined threshold, either PCI-E interface 206 or 220 can send the link into a "Low Power Idle" (LOS) state 404. In this state, a fast training sequence (FTS) is transmitted through the link in an attempt to reestablish a connection. If successful, the link returns to L0 state 402. On the other hand, when the FTS fails, a "Recovery" state 406 is entered. In this state, a long training sequence (LTS) is transmitted to reestablish the connection and return the link to L0 state 402.

In some embodiments of the present invention, counter 208 is configured to count a number of times Recovery state 406 is entered. This count provides an approximate measure of how much time is being occupied by recovery from link errors as opposed to transmitting data. In other embodiments, one or more counters 208 are configured to measure the duration of time during which downlink 212 and uplink 214 remain in Low Power Idle state 404 and/or the length of time downlink 212 and uplink 214 spend returning to L0 state 402 from Low Power Idle state 404 and/or Recovery state 406.

In accordance with the present invention, counter data from counter 208 is read out and used to compute one or more health statistics indicating the health of the PCI-E link. Referring back to FIG. 1, a driver executing on CPU 102 can be configured to communicate with I/O bridge 107 to obtain the counter data from counter 208. The driver may compute the health statistics, which can be displayed on display screen 110 in response to user commands.

Figure 5:
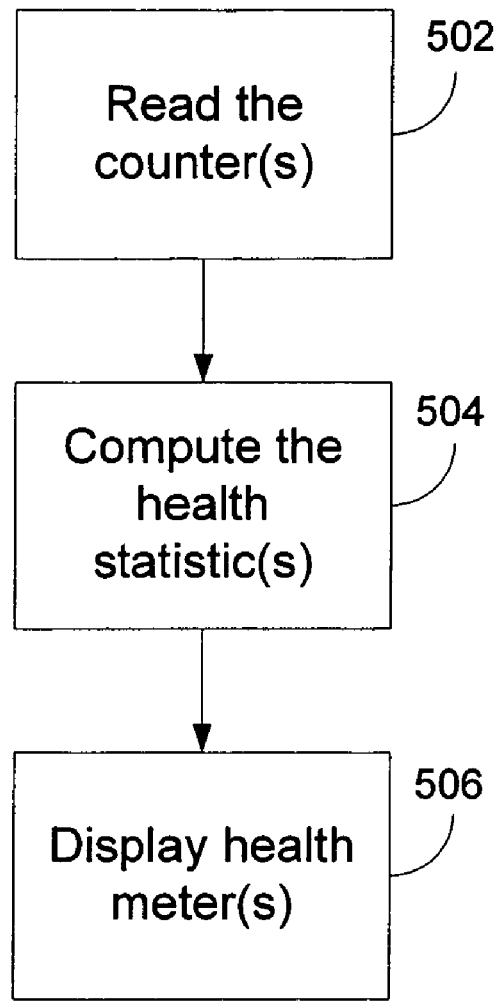
FIG. 5 is a flow diagram of a process for determining health statistics according to an embodiment of the present invention.

FIG. 5 is a flow diagram of a process for determining health statistics in accordance with an embodiment of the present invention. This process can be performed by a graphics driver or other health statistic application executing on CPU 102 of FIG. 1. In step 502, counter data representing data sent and errors occurring in a high-speed interface link is read. Examples of counter data include, but are not limited to, a number (L) of packets sent to graphics processor 216 by I/O bridge 202 that are either lost (e.g., timed out) or received with errors (e.g., NO-ACK), a number (E) of packets received by I/O bridge 202 from graphics processor 216 that contain errors, a total number (M) of packets sent from I/O bridge 202 to graphics processor 216, a total number (G) of packets received by I/O bridge 202 from graphics processor 216, a number (N) of times a recovery state is entered, and an amount of data sent to the graphics processor.

In step 504, one or more health statistics based on the counter data are computed. A "health statistic," as used herein, can be any numerical quantity representing the degree to which the link is or is not performing correctly (i.e., without error). In one embodiment of the present invention, one health statistic (H) is represented by the formula:

$$H = 100\left\{\left(1 - \frac{L}{M}\right)\left(1 - \frac{E}{G}\right)\left(1 - \frac{R}{t}\right)\right\}, \quad \text{(Eq. 1)}$$

where R is the period of time spent in Recovery state 406 since the last counter sampling, and t is the total elapsed time since the last counter sampling. In this embodiment, H is between 0 and 100, with 100 representing perfect health.

In step 506, a health meter is displayed. In one embodiment of the present invention, the health meter displays a graphical representation of each health statistic. The graphical representation advantageously makes it apparent how well the link is performing.

It will be appreciated that process 500 is illustrative and that variations and modifications are possible. In some embodiments, the driver program is configured to execute process 500 automatically (e.g., at regular intervals) so that up-to-date health statistics are continually available. In other embodiments, process 500 or portions thereof, such as displaying the health meter, may be executed in response to a user command. In some embodiments, counter 208 or other circuits within I/O bridge 202 might be configured to compute the health statistics and communicate the health statistics to the driver program in addition to or instead of the counter values.

Figure 6:
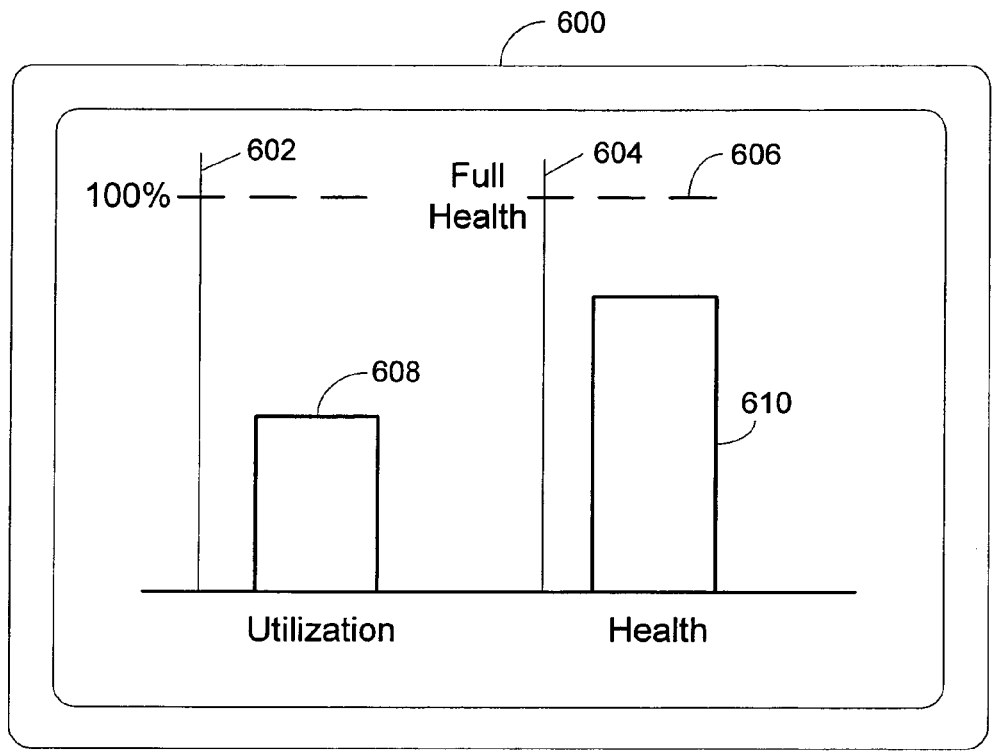
FIG. 6 is a display of health statistics according to an embodiment of the present invention.

FIG. 6 is a display of health statistics according to an embodiment of the present invention. An onscreen window 600, which can be generated using conventional techniques, displays a health statistic as a bar graph 604, with height of the bar 610 correlating to the computed health statistic. In the example shown in FIG. 6, a "full health" line 606 representing the value the health statistic would have under perfect conditions is shown to allow a user to visualize how "healthy" the high-speed link is (i.e., how efficiently the high-speed link is performing).

Window 600 may also show other statistics. For instance, window 600 displays bus utilization as a bar graph 602. A bus utilization value 608 may be calculated based on an amount (S) of data (referring to data 322 of packet 300) sent during a time interval to a slave processor (such as GPU 216) and a theoretical upper limit (Smax) that, in some embodiments, depends on packet size.

Figure 7:
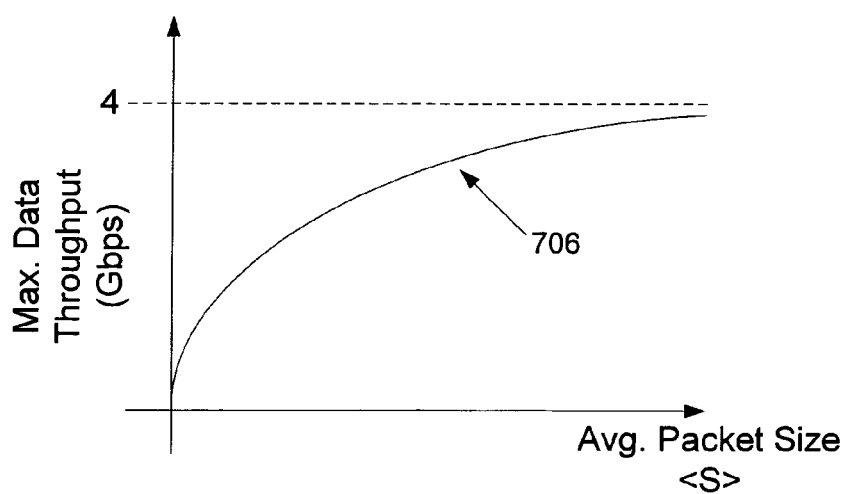
FIG. 7 is a graph illustrating a bus capacity as a function of packet size according to an embodiment of the present invention.

FIG. 7 is a graph illustrating a bus capacity as a function of average packet size according to an embodiment of the present invention. In some embodiments, the graph 706 is used to determine Smax, the maximum throughput of the bus for a given average packet size <S>. It should be appreciated that maximum throughput Smax may vary depending on a number of factors, such as the number of bus lanes used and the data protocol used. Referring to FIG. 3, as average packet size increases, header 320 stays constant and payload 322 increases. The bus can theoretically send a maximum number of bits per second (e.g., 4 Gbps for a 16-lane PCI-E link); as average packet size increases, the fraction of those bits that can be used to carry data increases. Thus, the bus capacity increases with average packet size, as reflected in FIG. 7.

In some embodiments of the present invention, to calculate the average packet size <S>, the amount of data (S) sent is divided by the total number (M) of packets. Using the correlation between <S> and Smax found on graph 706, Smax can be determined. S and Smax are then used to calculate a bus utilization value (B). For instance, bus utilization value (B) may be found using the formula:

$$B = 100 \left\{ \frac{S/T}{S\max} \right\}, \quad \text{(Eq. 2)}$$

where Smax is the maximum throughput for the measured average packet size (S/M) and T is the total elapsed time during which the amount of data S is transferred. In some embodiments, Smax can be rounded to a convenient unit, e.g., a byte (8 bits), word (32 bits), or double word (64 bits).

In some embodiments, the data throughput can be displayed for a known repetitive sequence of data. The health statistic application (e.g., the graphics driver) can request an I/O device (e.g., a GPU) to transfer the repetitive sequence between the I/O bridge and the I/O device and measure the amount of data successfully transmitted over a measured time interval. Changes in throughput can be observed by referencing the bus health and efficiency statistics.

In accordance with an embodiment of the present invention, bus utilization data and health statistics can be used to adjust (increase or decrease) a bus clock speed (e.g., of reference clock 210) of a high-speed interface link to optimize the bus utilization value. For instance, a user can look at window 600, change a clock speed, and observe what happens to bus utilization, throughput, and link health. In other embodiments, a bridge chip with counters may be used to read counter data. In still other embodiments, a driver program or other application program could be used to automatically compute health statistics and generate an on-screen alert if the statistic falls below a minimum level.

It is to be understood that the above description is intended to be illustrative and not restrictive. Many embodiments will be apparent to those of skill in the art upon reviewing the above description. For example, embodiments of the present invention can be implemented in any computer architecture with a high-speed link between components. Embodiments of the present invention are not limited to graphics processors and I/O bridges. The health of any link between a bus interface and a slave processor or any two bus devices could be monitored. Graphical representations of health statistics could be shown in any number of ways, such as a bar graph or pie chart.

Computer programs incorporating various features of the present invention may be encoded on various computer readable media for storage and/or transmission; suitable media include magnetic disk or tape, optical storage media such as compact disk (CD) or DVD (digital versatile disk), flash memory, and carrier signals adapted for transmission via wired, optical, and/or wireless networks conforming to a variety of protocols, including the Internet. Computer readable media encoded with the program code may be packaged with a compatible device or provided separately from other devices (e.g., via Internet download).

While the present invention has been described with reference to specific hardware and software components, those skilled in the art will appreciate that different combinations of hardware and/or software components may also be used, and that particular operations described as being implemented in hardware might also be implemented in software or vice versa.

Other embodiments of the present invention include showing any or all of the multiple health statistics, allowing the user to choose which health statistics to display, creating a log of the health information that the user can review at a later time. It will be appreciated that embodiments of the present invention are not limited to PCI-E.

The scope of the invention should, therefore, be determined not with reference to the above description, but instead should be determined with reference to the appended claims along with their full scope of equivalents.

What is claimed is:

1. A method of measuring health of a high-speed interface link in a computer system, the method comprising:
   reading counter data representing a number of units of data sent and a number of errors for a high-speed interface link between a bus interface unit and a slave processor, wherein the counter data includes:
   a number (L) of packets sent to the slave processor by the bus interface unit that are lost or received with errors;

a number (E) of packets received by the bus interface unit from the slave processor that contain errors;
a total number (M) of packets sent from the bus interface unit to the slave processor;
a total number (G) of packets received by the bus interface unit from the slave processor; and
a length of time (R) the high-speed interface link spends in a recovery mode since the counter data was last read;
computing a health statistic (H) based on the counter data; and
displaying the health statistic H on a display device of the computer system.

2. The method of claim 1 wherein the counter data further includes:
a rate at which resent packets are received;
a length of time the high-speed interface link remains in a low power state; and
a number (N) of times when the high-speed interface link enters a recovery mode.

3. The method of claim 1 wherein the health statistic H is computed using a formula:

$$H = 100\left\{\left(1 - \frac{L}{M}\right)\left(1 - \frac{E}{G}\right)\left(1 - \frac{R}{t}\right)\right\},$$

wherein t is a total elapsed time since the counter data was last read.

4. The method of claim 1 wherein the bus interface unit is an I/O bridge.

5. The method of claim 1 wherein the slave processor is a graphics processor.

6. The method of claim 1 wherein the high-speed interface link is a PCI Express link or a HyperTransport link.

7. The method of claim 6 wherein the recovery mode is entered:
when the high-speed interface link is idle for a specified amount of time and a fast reconnect operation fails; or
when a specified number of packets are incorrectly received by the slave processor and a fast reconnect operation fails.

8. The method of claim 1 wherein the health statistic H is displayed as a graphical representation.

9. The method of claim 1 further comprising:
measuring an amount (S) of data sent to the slave processor;
calculating a bus utilization value (B) based on the amount of data sent during a time interval and a maximum data throughput (Smax) for a measured average packet size defined as S/M; and
displaying the bus utilization value.

10. The method of claim 9 wherein the bus utilization value B is computed using a formula:

$$B = 100\left\{\frac{S/T}{S\max}\right\},$$

wherein T is the total elapsed time during which the amount of data S is transferred.

11. The method of claim 9 wherein the bus utilization value is displayed as a graphical representation.

12. The method of claim 9 further comprising:
adjusting a bus clock speed of the high-speed interface link based on the bus utilization value B and the health statistic H.

13. A computer program product comprising:
a computer readable storage medium encoded with program code for controlling operation of a computer system having a bus interface unit and a slave processor, the program code including:
program code for detecting a number (L) of packets sent to the slave processor by the bus interface unit that are lost or received with errors;
program code for detecting a number (E) of packets received by the bus interface unit from the slave processor that contain errors;
program code for detecting a total number (M) of packets sent from the bus interface unit to the slave processor;
program code for detecting a total number (G) of packets received by the bus interface unit from the slave processor;
program code for determining a length of time (R) the high-speed interface link spends in a recovery mode since the counter data was last read;
program code for computing a health statistic (H) based at least in part on L, E, M, G, and R; and
program code for displaying the health statistic relating to the high-speed interface link.

14. The computer program product of claim 13 further comprising:
program code for automatically computing health statistics in a background mode; and
program code for generating an on-screen alert if the health statistic falls below a minimum level.

15. A device for measuring health of a high-speed interface link connecting first and second components of a computer system, the device comprising:
a counter module disposed in a first one of the components and configured to count occurrences of an event relevant to health of the high-speed interface link connecting the first and second components, wherein the counter module includes counters configured to produce counter data including:
a number (L) of packets sent to a slave processor by a bus interface unit that are lost or received with errors;
a total number (M) of packets sent from the bus interface unit to the slave processor;
a number (E) of packets received by the bus interface unit from the slave processor that contain errors;
a total number (G) of packets received by the bus interface unit from the slave processor; and
a length of time (R) spent in a recovery mode since the counter data was last read; and
a computation module coupled to receive the counter data from the counter module and configured to compute a health statistic (H) based on the counter data.

16. The device of claim 15 wherein the first one of the components is a bridge chip.

17. The device of claim 15 wherein the health statistic H is computed using a formula:

$$H = 100\left\{\left(1 - \frac{L}{M}\right)\left(1 - \frac{E}{G}\right)\left(1 - \frac{R}{t}\right)\right\},$$

wherein t is a total elapsed time since the counter data was last read.

18. The device of claim 17 wherein the recovery mode is entered:
   when the high-speed interface link is idle for a specified amount of time and a fast reconnect mode fails; or
   when a specified number of packets are incorrectly received by the graphics processor and a fast reconnect mode fails.

19. The device of claim 15 wherein the computation module is further configured to:
   calculate a bus utilization value (B) based on an amount of data (S) sent by the first component to the second component during a time interval and a maximum data throughput (Smax) measured for an average packet size defined as S/M; and
   display the bus utilization value.

20. The device of claim 19 wherein the bus utilization value B is computed using a formula:

$$B = 100\left\{\frac{S/T}{S\text{max}}\right\},$$

wherein T is a total elapsed time during which the amount of data S is transferred.

* * * * *